(12) United States Patent
Morifuji

(10) Patent No.: US 6,421,351 B1
(45) Date of Patent: Jul. 16, 2002

(54) CELL PHASE CONTROL DEVICE APPLICABLE TO DATA OF SIZE EXCEEDING FIXED LENGTH DEFINED IN ADVANCE WITH RESPECT TO CELL LENGTH OF WRITE PULSE SIGNAL OR READ PULSE

(75) Inventor: Mamoru Morifuji, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/139,437

(22) Filed: Aug. 25, 1998

(30) Foreign Application Priority Data

Aug. 26, 1997 (JP) .............................................. 9-244632

(51) Int. Cl.⁷ .............................................. H04L 12/54
(52) U.S. Cl. ...................................... 370/429; 711/171
(58) Field of Search .................................. 370/375, 378, 370/379, 428, 429; 365/189.04, 189.02, 189.07; 710/25, 22, 52; 711/1–3, 100–106, 147, 148, 153, 170–173

(56) References Cited

U.S. PATENT DOCUMENTS

| | | | | | |
|---|---|---|---|---|---|
| 5,311,517 A | * | 5/1994 | Senoo | ......................... | 370/428 |
| 5,319,596 A | * | 6/1994 | Kogure | ................... | 365/189.04 |
| 5,436,863 A | * | 7/1995 | Kogure | ................... | 365/189.04 |
| 5,765,186 A | * | 6/1998 | Searby | ....................... | 711/100 |

FOREIGN PATENT DOCUMENTS

| | | |
|---|---|---|
| JP | 62-64192 | 3/1987 |
| JP | 1-215137 | 8/1989 |
| JP | 2114732 | 4/1990 |
| JP | 4-220829 | 8/1992 |
| JP | 7-58753 | 3/1995 |
| JP | 7-297918 | 11/1995 |
| JP | 7-307797 | 11/1995 |
| JP | 9205434 | 8/1997 |
| JP | 9-224080 | 8/1997 |

OTHER PUBLICATIONS

Office Action Issued by the Japanese Patent Office for the Corresponding Japanese Application Dated Feb. 9, 1999 and an English Translation thereof.

Japanese Office Action issued Nov. 2, 1999 in a related application with English translation of relevant portions.

* cited by examiner

*Primary Examiner*—Ajit Patel
(74) *Attorney, Agent, or Firm*—Dickstein, Shapiro, Morin & Oshinsky, LLP.

(57) ABSTRACT

A cell phase control device comprises a plurality of two-port RAMs, a write control unit to write cell data in order into the plurality of two-port RAMs, and write cell data simultaneously into the plurality of two-port RAMs as required, a read control unit to read cell data in order from the plurality of two-port RAMS, and an arbitration control unit to arbitrate operation of the write control unit and that of the read control unit, the write control unit, after writing one cell data into one of the plurality of two-port RAMs, writes the subsequent one cell data into other one of the plurality of the two-port RAMs, as well as continuously writes, for a fixed time period, the subsequent cell data into the two-port RAM into which the one cell data has been written.

8 Claims, 5 Drawing Sheets

CELL PHASE CONTROL DEVICE APPLICABLE TO DATA OF SIZE EXCEEDING FIXED LENGTH DEFINED IN ADVANCE WITH RESPECT TO CELL LENGTH OF WRITE PULSE SIGNAL OR READ PULSE

BACKGROUND OF THE INVENTION

1. Field of the Invention

The present invention relates to a cell phase control device enabling a cell having no phase difference between writing and reading to be sent and received between circuits operative in response to a clock signal and a cell phase pulse independent of each other in digital asynchronous transfer mode (ATM) communication.

2. Description of the Related Art

Cell phase control devices of this kind are conventionally used for sending and receiving cells at a fixed length between circuits operative in response to a clock signal and a cell phase pulse independent of each other.

One of conventional cell phase control devices, for example, is disclosed in Japanese Patent Laying-Open (Kokai) No. Heisei 4-220829, entitled "Cell Phase control Circuit". The literature proposes a cell phase control circuit which, even when a write pulse or a read pulse is applied in a cycle not normal, automatically recovers after the restoration of input conditions to enable effects of a failure to be minimized.

FIG. 4 is a block diagram showing structure of such a cell phase control device as mentioned above. The cell phase control device shown in FIG. 4 employs the same fixed size (fixed length) as the sizes of cell data to be written and cell data to be read. FIG. 5 is a timing chart for use in explaining operation of writing to a memory and reading from the memory at the cell phase control device shown in FIG. 4.

With reference to FIGS. 4 and 5, the size of a write region within a two-port RAM (Random Access Memory) 100 is fixed. Upon receiving input of a cell whose size is larger than the fixed write size as a basis, a write control unit 103 accordingly generates an internal write signal 113 equivalent to a fixed-length part of the cell corresponding to the write size of the two-port RAM 100. As a result, only the data equivalent to the fixed length is written into the two-port RAM 100, while surplus data is not written but abandoned. Cell data C3 shown in FIG. 5, for example, is data whose length is longer than the fixed length by TX. The TX part of the cell data C3 will not be written into the two-port RAM 100 but abandoned as surplus data.

In the conventional cell phase control device, a read control unit 104 also generates, with the fixed write size of the two-port RAM 100 as a basis, an internal read signal 123 of the fixed length in question to send cell data of the fixed length constantly.

As described in the foregoing, the conventional cell phase control devices are premised on that cell lengths of write and read pulses to be applied are of a fixed size. As to such data whose size is larger than the fixed size as data for controlling a device, surplus data other than data equivalent to the fixed length will be abandoned as described in the foregoing.

To avoid such a situation, data for controlling a device should be conventionally divided into a plurality of cells of a fixed length and then transferred or should be transferred through other path, making procedures complicated.

SUMMARY OF THE INVENTION

An object of the present invention is to provide a cell phase control device which solves the above-described conventional problem and on the premise that a cell length of a write pulse signal or a read pulse to be applied is a fixed length, enables even data for controlling a device whose size exceeds the fixed length to change a phase using a transmission path for use in transfer of data of the fixed length without abandoning the data.

According to one aspect of the invention, a cell phase control device which sends and receives cells between circuits operative in response to a clock signal and a cell phase pulse independent of each other in digital asynchronous transfer mode communication, comprises a plurality of buffers, writing means responsive to a write pulse signal and a write clock signal for writing cell data into the plurality of buffers in order, and writing cell data simultaneously into the plurality of buffers as required, reading means responsive to a read pulse signal and a read clock signal for reading the cell data from the plurality of buffers in order, and control means for arbitrating writing operation by the writing means and reading operation by the reading means, wherein the writing means, after writing one cell data into one of the plurality of buffers, writes the subsequent one cell data into other one of the plurality of buffers, as well as continuously writing, for a fixed time period, the subsequent cell data into the buffer into which the one cell data has been written.

In the preferred construction, the buffer is a two-port RAM.

In another preferred construction, cell data to be read or written from/into the buffer are of two sizes, and the writing means starts writing, into one of the plurality of buffers, at the top of one cell data to write, irrespective of the size of the one cell data, data in the amount equivalent to cell data of a larger size.

In another preferred construction, cell data to be read or written from/into the buffer are of two sizes, and the reading means reads cell data written in the buffer on a cell basis.

In another preferred construction, cell data to be read or written from/into the buffer are of two sizes, and the reading means when cell data of a larger size is written in the buffer, reads all the data written in the buffer, and when cell data of a smaller size and part of the other cell data are written in the buffer, reads only the cell data of the smaller size.

In another preferred construction, cell data to be read or written from/into the buffer are of two sizes, the writing means starts writing, into one of the plurality of buffers, at the top of one cell data to write, irrespective of the size of the one cell data, data in the amount equivalent to cell data of a larger size, and the reading means reads cell data written in the buffer on a cell basis.

In another preferred construction, cell data to be read or written from/into the buffer are of two sizes, the writing means starts writing, into one of the plurality of buffers, at the top of one cell data to write, irrespective of the size of the one cell data, data in the amount equivalent to cell data of a larger size, and the reading means when cell data of the larger size is written in the buffer, reads all the data written in the buffer, and when cell data of a smaller size and part of the other cell data are written in the buffer, reads only the cell data of the smaller size.

Also, the cell phase control device further comprises selective output means for receiving cell data read from the plurality of buffers and selectively switching to output one of the cell data.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, the present invention will be outlined. A cell phase control device of the present invention includes two two-port RAMs. In the processing of writing one of the two-port RAMS according to a write signal output by a write control means in response to a write pulse and a write permission from an arbitration control means. Subsequent input data is written into the other of the two-port RAMs according to a write signal which the write control means outputs in response to a subsequent write pulse and a write permission from the arbitration control means. In addition, while writing into one of the two-port RAMs is conducted, writing operation with respect to the other of the two-port RAMs is allowed to continue without stopping.

In the processing of reading data from the two-port RAMs, output data is read from one of the two-port RAMs according to a read signal output by a read control means in response to a read pulse and a read permission from the arbitration control means, and the subsequent. Subsequent output data is read from the other of the two-port RAMs according to a read signal which the read control means outputs in response to the subsequent read pulse and a read permission from the arbitration control means. In addition, in the reading processing, determination is made as to from which of two-port RAMs read data is to be output to output one of the read data by selector switching.

As described in the foregoing, even at the reception of input of data for use in controlling the device larger than the size (fixed length) of cell data, provision of two two-port RAMs enables the cell phase control device oft he present invention to accumulate data in excess of the fixed length. In addition, when reading the long data, the device is allowed to read the long data by lengthening an interval of a read pulse. Therefore, even when such data whose size exceeds a fixed length as data for controlling the device is applied, phase control is possible using a transmission path for use in transfer of data of the fixed length without the abandonment of surplus part of the data.

Figure 1:
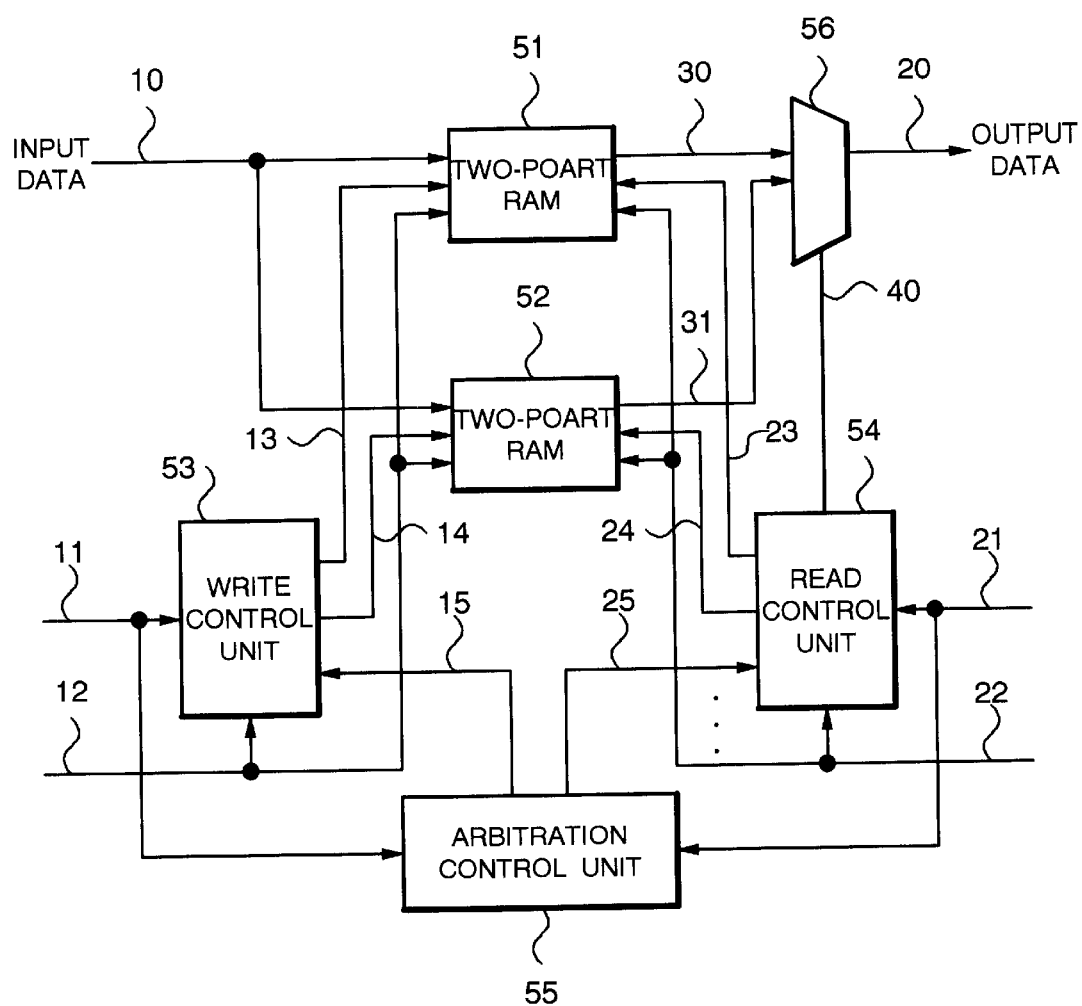
FIG. 1 is a block diagram showing structure of a cell phase control device according to one embodiment of the present invention.

FIG. 1 is a block diagram showing structure of a cell phase control device according to one embodiment of the present invention. With reference to FIG. 1, the cell phase control device of the present embodiment includes two two-port RAMs 51 and 52, a write control unit 53, a read control unit 54, an arbitration control unit 55 and a selector 56. In FIG. 1, illustration is made only of a characteristic part of the structure of the present embodiment and that of the remaining common part is omitted.

On the two-port RAM 51, a cell-basis buffer region is provided into which cell data of input data 10 is written according to an internal write signal A13 supplied from the write control unit 53. In addition, cell data written in the buffer region is read and output as internal output data A30 according to an internal read signal A23 supplied from the read control unit 54.

On the two-port RAM 52, a cell-basis buffer region is provided into which cell data of the input data 10 is written according to an internal write signal B14 supplied from the write control unit 53. In addition, cell data written in the buffer region is read and output as internal output data B31 according to an internal read signal B24 supplied from the read control unit 54.

The write control unit 53, which is implemented, for example, by a program-controlled CPU, generates the write signal A13 and the write signal B14 and outputs the same to the two-port RAMs 51 and 52, respectively, according to a write pulse signal 11 and a write permission signal 15 from the arbitration control unit 55. Although the write signal A13 and the write signal B14 are alternately output to the two-port RAM 51 and the two-port RAM 52, before write of input data into one of the two-port RAMs 51 and 52 is completed, write of input data into the other can be started.

The read control unit 54, which is implemented, for example, by a program-controlled CPU, generates the read signal A23 and the read signal B24 and outputs the same to the two-port RAMs 51 and 52 in response to a read pulse signal 21 and a read permission signal 25 from the arbitration control unit 55. In addition, the read control unit 54 outputs, to the selector 56, a selector switching signal 40 for the switching of output between the internal output data A30 and the internal output data B31.

The arbitration control unit 55, which is implemented, for example, by a program-controlled CPU, manages cell residence conditions in the two-port RAMs 51 and 52 to generate the write permission signal 15 to the write control unit 53 and the read permission signal 25 to the read control unit 54 based on the write pulse signal 11 and the read pulse signal 21.

The selector 56 receives the internal output data A30 output from the two-port RAM 51 and the internal output data B31 output from the two-port RAM 52 and controls switching according to the selector switching signal 40 received from the read control unit 54 to output either the internal output data A30 or the internal output data B31 as output data 20.

Figure 2:
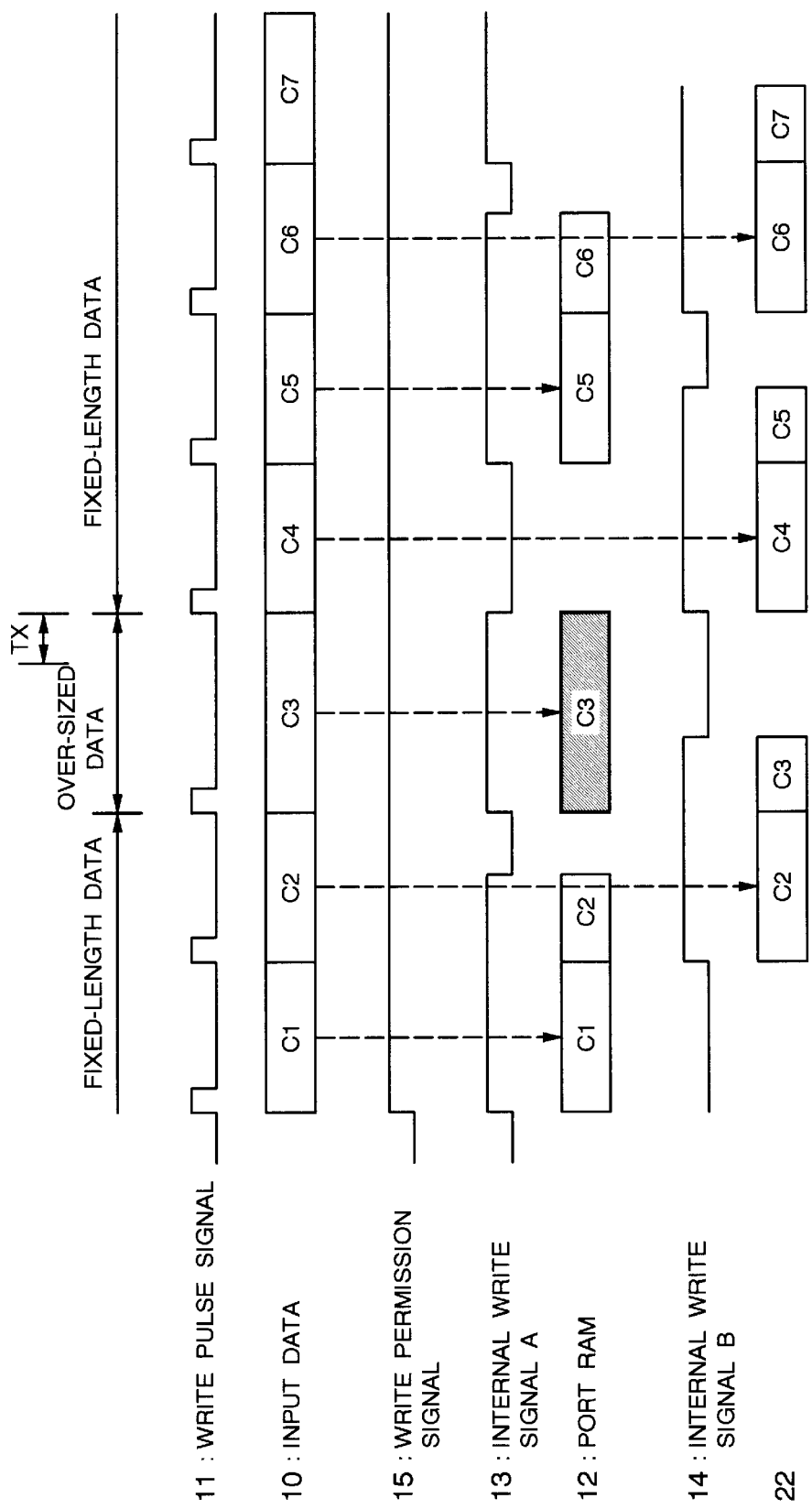
FIG. 2 is a timing chart showing writing operation in the present embodiment.
Figure 3:
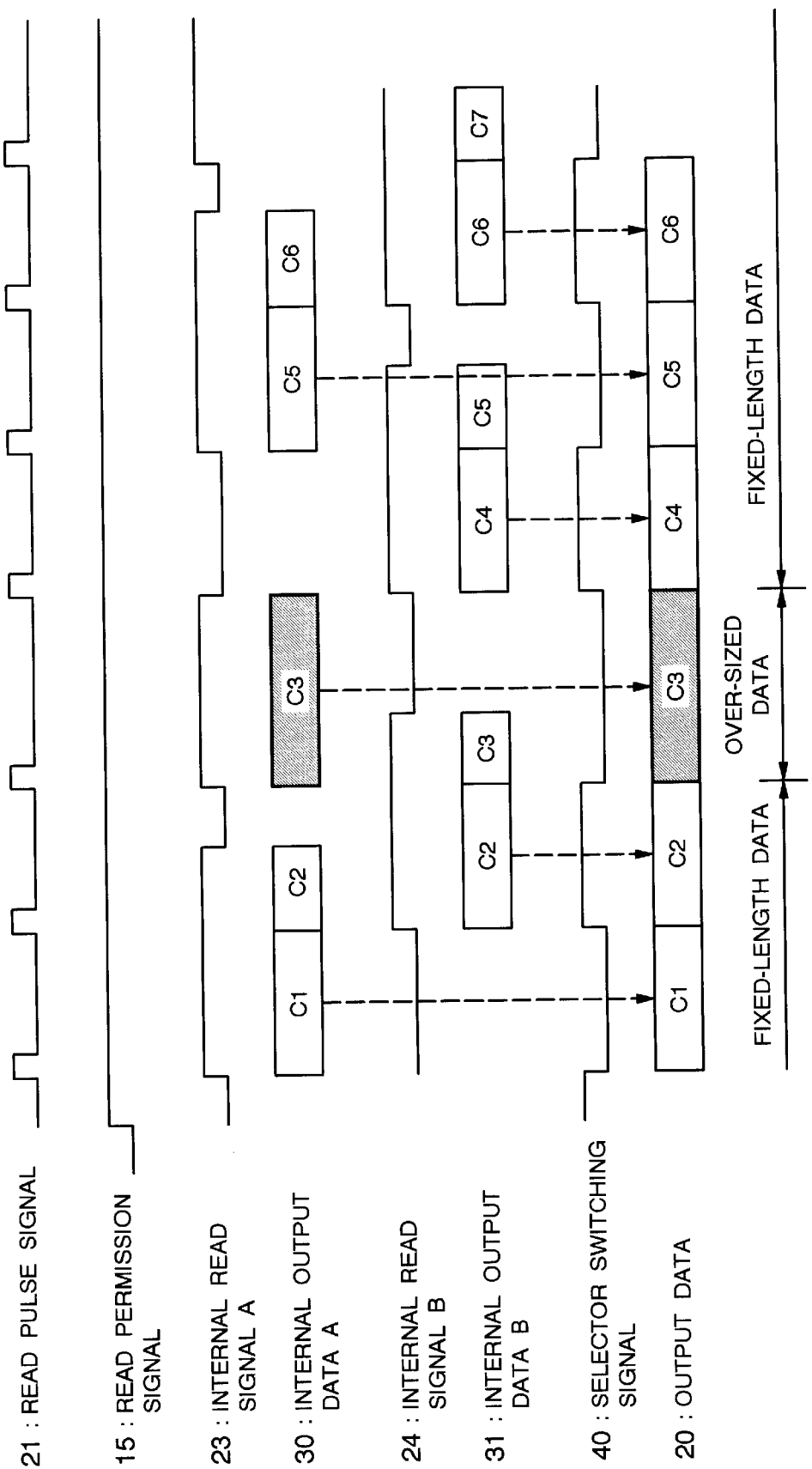
FIG. 3 is a timing chart showing reading operation in the present embodiment.
Figure 4:
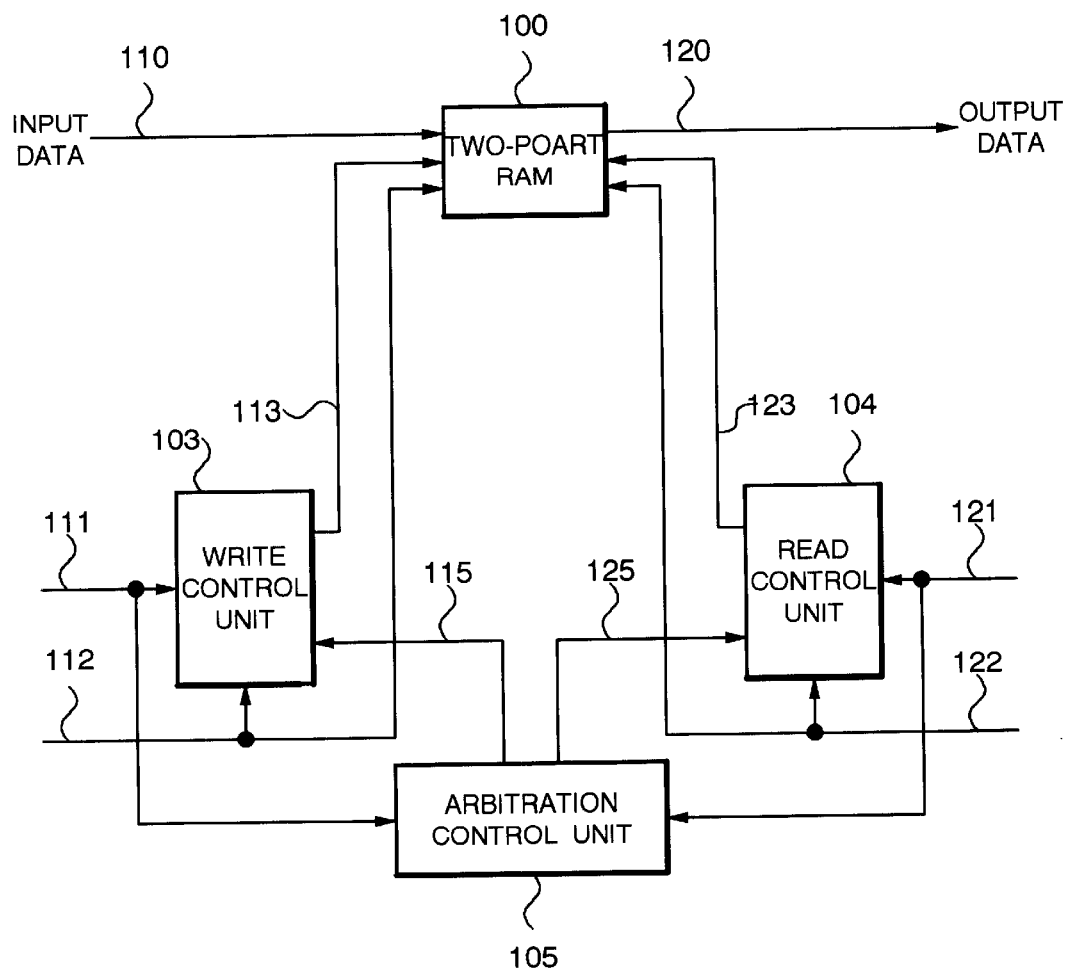
FIG. 4 is a block diagram showing structure of a conventional cell phase control circuit.
Figure 5:
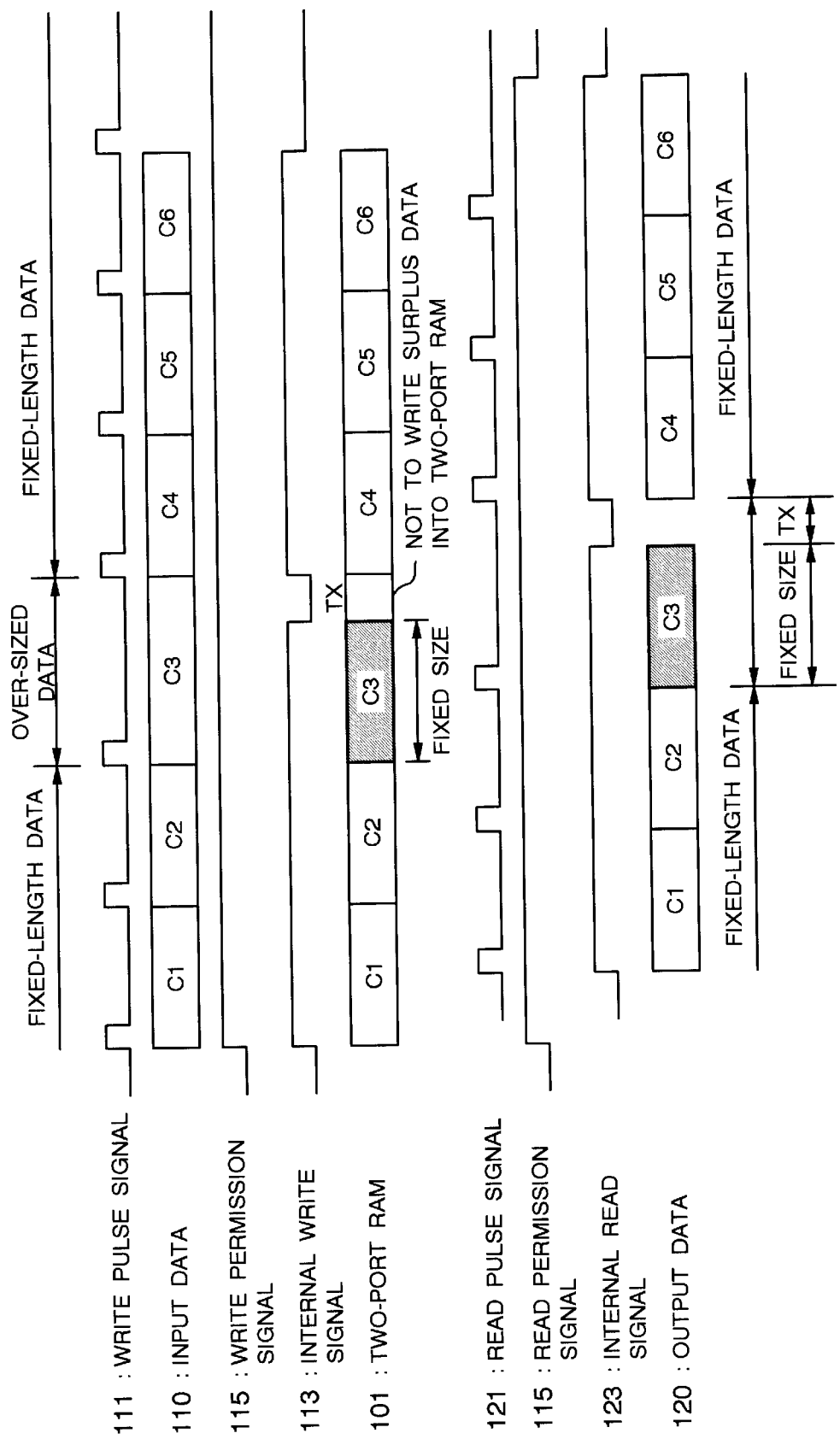
FIG. 5 is a timing chart showing writing operation and reading operation at the conventional cell phase control circuit.

Next, operation of one embodiment of the present invention will be described with reference to FIGS. 1, 2 and 3. FIGS. 2 and 3 are timing charts showing operation of the present embodiment in a case where cell data C1, C2, C3, C4, C5, C6 and C7 are sequentially applied as input data, among which C3 located between C2 and C4 out of the fixed-length data C1, C2, C4, C5, C6 and C7 is data for controlling the device, with FIG. 2 illustrating operation of writing processing and FIG. 3 illustrating operation of reading processing. Here, C3 is data longer by TX than the fixed length. Data for controlling the device is assumed to be data whose size exceeds a prescribed fixed length and whose size is known in advance.

With reference to FIGS. 1 and 2, when receiving the write pulse signal 11 and the write permission signal 15 from the arbitration control unit 55, the write control unit 53 sends the internal write signal A to the two-port RAM 51. As a result, input data is written into the two-port RAM 51. When not receiving the write permission signal from the arbitration control unit 55, the write control unit 53 fails to send the write control signal A to the two-port RAM 51, whereby none of the input data will be written into the two-port RAM 51.

When receiving the subsequent write pulse signal 11 and accepting the write permission signal 15 from the arbitration control unit 55, the write control unit 53 sends the internal write signal B14 to the two-port RAM 52. As a result, input data is written into the two-port RAM 52. When not receiving the write permission signal 15 from the arbitration control unit 55, the write control unit 53 fails to send the write control signal B14 to the two-port RAM 52, whereby none of the input data will be written into the two-port RAM 52.

Control for writing input data into either the two-port RAM 51 or the two-port RAM 52 is given by the management of outputs of the internal write signal A13 and the internal write signal B14 by the write control unit 53. The internal write signal A13 and the internal write signal B14 are alternately sent on the basis of a cell of the write pulse signal 11.

In addition, as shown in FIG. 2, while sending the internal write signal B14 in response to the write pulse signal 11 corresponding to C2, the write control unit 53 continues sending the internal write control signal A13 in response to the subsequent write pulse signal 11 for a fixed time period. The duration time is TX. Therefore, when the fixed-length data C1 is applied, the input data C1 and the input data C2 will be written into the two-port RAM 51. When the data C3 for controlling the device is applied, the whole of the input data C3 will be written into the two-port RAM 51 because the subsequent pulse signal is delayed according to the length of the data C3.

The foregoing operation results in that surplus part (TX part in FIG. 2) of the data C3 for controlling the device is not abandoned but written into the two-port RAM.

With reference to FIGS. 1 and 3, when receiving the read pulse signal 21 and accepting the read permission signal 25 from the arbitration control unit 55, the read control unit 54 sends the internal read signal A23 to the two-port RAM 51. This enables data to be read from the two-port RAM 51 and output as the internal output data A30. When not receiving the read permission signal 25 from the arbitration control unit 55, the read control unit 54 fails to send the internal read signal A23 to the two-port RAM 51, whereby no transmission of the internal output data A30 from the two-port RAM 51 is conducted.

When receiving the subsequent read pulse signal 21 and accepting the read permission signal 25 from the arbitration control unit 55, the read control unit 54 sends the internal read signal B24 to the two-port RAM 52. This enables data to be read from the two-port RAM 52 and output as the internal output data B31. Without the read permission signal 25 from the arbitration control unit 55, the read control unit 54 fails to send the internal read signal B24 to the two-port RAM 52, whereby no transmission of the internal output data B31 from the two-port RAM 52 is conducted.

Control for reading input data from either the two-port RAM 51 or the two-port RAM 52 is given by the management of outputs of the internal read signal A23 and the internal read signal A24 by the read control unit 54. The internal read signal A23 and the internal read signal B24 are alternately sent on the basis of a cell of the read pulse signal 21.

In addition, in response to the selector switching signal 40 output from the read control unit 54, the selector 56 is controlled to output one of the internal output data A30 and the internal output data B31 read from the two-port RAMs 51 and 52 as the output data 20. The selector switching signal 40 is switched according to the read pulse signal 21 to output, at the reading of fixed-length data, a signal of a width equivalent to the fixed length. At the reading of the data for controlling the device, a signal of a width equivalent to a length of the data in question is output.

In a case of reading of fixed-length data (e.g. C1), therefore, surplus data (C2 following C1) written in the two-port RAM 51 will be abandoned. On the other hand, in a case of reading of the data for controlling the device (C3), the data will be read with its size unchanged from that of the data as stored in the two-port RAM. It is therefore possible to read both fixed-length data and data for controlling the device whose size exceeds the fixed length with their sizes unchanged from those of the data at the time of application.

In the present embodiment, the arbitration control unit 55 manages conditions of residence in buffers at the two-port RAMs 51 and 52 based on the write pulse signal 11 and the read pulse signal 21. When the buffers of the two-port RAMs 51 and 52 are empty, the arbitration control unit 55 sends the write permission signal 15 to the write control unit 53 and fails to send the read permission signal 25 to the read control unit 54. On the other hand, when the buffers of the two-port RAMs are full, the unit 55 fails to send the write permission signal 15 to the write control unit 53 and sends the read permission signal 25 to the read control unit 54.

As described in the foregoing, the cell phase control device of the present invention has an effect of enabling, on the premise that a cell length of a write pulse signal or a read pulse to be applied is a fixed length, even data for controlling the device whose size exceeds the fixed length to be transferred with its phase control using a transmission path for use in transfer of fixed-length data without abandonment of the data.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A cell phase control device which sends and receives cells between circuits operative in response to a clock signal and a cell phase pulse independent of each other in digital asynchronous transfer mode communication, comprising:

a plurality of buffers;

writing means responsive to a write pulse signal and a write clock signal for writing cell data into said plurality of buffers in order, and writing cell data simultaneously into said plurality of buffers as required;

reading means responsive to a read pulse signal and a read clock signal for reading said cell data from said plurality of buffers in order; and control means for arbitrating writing operation by said writing means and reading operation by said reading means; wherein said writing means, after writing one cell data into a first buffer of said plurality of buffers, writes the subsequent one cell data into a second buffer of said plurality of buffers, said writing means continuously writing, for a fixed time period, the subsequent cell data into said first buffer into which said one cell data has been written.

2. The cell phase control device as set forth in claim 1, wherein said first buffer is a two-port RAM.

3. The cell phase control device as set forth in claim 1, wherein cell data to be read or written from/into said plurality of buffers are of two sizes, and said writing means starts writing, into one of said plurality of buffers, at the beginning of the data in one cell data, irrespective of the size of the one cell data, data in the amount equivalent to cell data of a larger size.

4. The cell phase control device as set forth in claim 1, wherein cell data to be read or written from/into said buffer are of two sizes, and said reading means reads cell data written in said buffer on a cell basis.

5. The cell phase control device as set forth in claim 1, wherein cell data to be read or written from/into said buffer are of two sizes, and said reading means when cell data of a larger size is written in said buffer, reads all the data written in said buffer, and when cell data of a smaller size and part of the other cell data are written in said buffer, reads only the cell data of the smaller size.

6. The cell phase control device as set forth in claim 1, wherein cell data to be read or written from/into said buffer are of two sizes, said writing means starts writing, into one of said plurality of buffers, at the beginning of the data in one cell data in the amount equivalent to cell data of a larger size, and said reading means reads cell data written in said buffer on a cell basis.

7. The cell phase control device as set forth in claim 1, wherein cell data to be read or written from/into said buffer are of two sizes, said writing means starts writing, into one of said plurality of buffers, at the beginning of the data in one cell data, irrespective of the size of the one cell data, data in the amount equivalent to cell data of a larger size, and said reading means when cell data of the larger size is written in said buffer, reads all the data written in said buffer, and when cell data of a smaller size and part of the other cell data are written in said buffer, reads only the cell data of the smaller size.

8. The cell phase control device as set forth claim 1, further comprising selective output means for receiving cell data read from said plurality of buffers and selectively switching to output one of the cell data.

* * * * *